(12) United States Patent
Jeong et al.

(10) Patent No.: US 10,381,875 B2
(45) Date of Patent: Aug. 13, 2019

(54) WIRELESS POWER TRANSFER THROUGH A METAL OBJECT

(71) Applicant: QUALCOMM Incorporated, San Diego, CA (US)

(72) Inventors: Seong Heon Jeong, San Diego, CA (US); Mei-Li Chi, San Diego, CA (US); Curtis Gong, San Diego, CA (US); David George Fern, Santee, CA (US); Francesco Carobolante, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 14/616,021

(22) Filed: Feb. 6, 2015

(65) Prior Publication Data

US 2016/0006293 A1    Jan. 7, 2016

Related U.S. Application Data

(60) Provisional application No. 62/021,665, filed on Jul. 7, 2014.

(51) Int. Cl.
*H02J 50/12*    (2016.01)
*H02J 7/02*    (2016.01)
(Continued)

(52) U.S. Cl.
CPC ............ *H02J 50/12* (2016.02); *G06F 1/1626* (2013.01); *G06F 1/1656* (2013.01); *G06F 1/263* (2013.01);
(Continued)

(58) Field of Classification Search
CPC ...................................................... H02J 7/025
See application file for complete search history.

(56) References Cited

U.S. PATENT DOCUMENTS 8,581,542 B2    11/2013    Cook et al.
8,922,438 B2    12/2014    Nakano
(Continued)

FOREIGN PATENT DOCUMENTS

CN    103025563 A    4/2013
JP    2009290764 A    12/2009
(Continued)

OTHER PUBLICATIONS

International Search Report and Written Opinion—PCT/US2015/033351—ISA/EPO—dated Aug. 6, 2015.

*Primary Examiner* — Robert Grant
*Assistant Examiner* — Tynese V McDaniel

(57) ABSTRACT

A method and system for providing wireless power transfer through a metal object is provided. In one aspect, an apparatus for wirelessly receiving power via a magnetic field is provided. The apparatus includes a metal cover including an inner portion and an outer portion. The outer portion is configured to form a loop around the inner portion of the metal cover. The outer portion is configured to inductively couple power via the magnetic field. The apparatus includes a receive circuit electrically coupled to the outer portion and configured to receive a current from the outer portion generated in response to the magnetic field. The receive circuit is configured to charge or power a load based on the current.

33 Claims, 9 Drawing Sheets

(51) Int. Cl.
  *H02J 5/00*     (2016.01)
  *H04B 5/00*     (2006.01)
  *G06F 1/16*     (2006.01)
  *G06F 1/26*     (2006.01)
  *H01F 38/14*    (2006.01)

(52) U.S. Cl.
  CPC .............. *H02J 5/005* (2013.01); *H02J 7/025* (2013.01); *H04B 5/0037* (2013.01); *H04B 5/0075* (2013.01); *H01F 38/14* (2013.01)

(56) References Cited

U.S. PATENT DOCUMENTS

| | | | |
|---|---|---|---|
| 9,444,130 B2 * | 9/2016 | Bevelacqua | H01Q 1/243 |
| 9,559,405 B2 | 1/2017 | Sorrell et al. | |
| 2009/0079268 A1 | 3/2009 | Cook et al. | |
| 2010/0277120 A1 | 11/2010 | Cook et al. | |
| 2011/0037662 A1 * | 2/2011 | Teng | H01Q 1/243 |
| | | | 343/702 |
| 2012/0157175 A1 | 6/2012 | Golko et al. | |
| 2012/0299785 A1 * | 11/2012 | Bevelacqua | H01Q 9/42 |
| | | | 343/702 |
| 2013/0027254 A1 | 1/2013 | Korva et al. | |
| 2013/0038278 A1 * | 2/2013 | Park | H02J 7/00 |
| | | | 320/108 |
| 2013/0318766 A1 | 12/2013 | Kiple et al. | |
| 2014/0177139 A1 | 6/2014 | Kari | |
| 2015/0137742 A1 * | 5/2015 | Tseng | H02J 7/025 |
| | | | 320/108 |
| 2015/0222126 A1 * | 8/2015 | Leabman | H02J 7/0042 |
| | | | 307/104 |

FOREIGN PATENT DOCUMENTS

| | | |
|---|---|---|
| JP | 2012186811 A | 9/2012 |
| JP | 2012249281 A | 12/2012 |
| JP | 2013042376 A | 2/2013 |
| JP | 2015149833 A | 8/2015 |
| TW | M475107 U | 3/2014 |
| WO | 2010028375 A1 | 3/2010 |
| WO | 2010144886 A1 | 12/2010 |
| WO | WO-2011076582 A1 | 6/2011 |
| WO | WO-2012005603 A1 | 1/2012 |
| WO | 2013179284 A2 | 12/2013 |

* cited by examiner

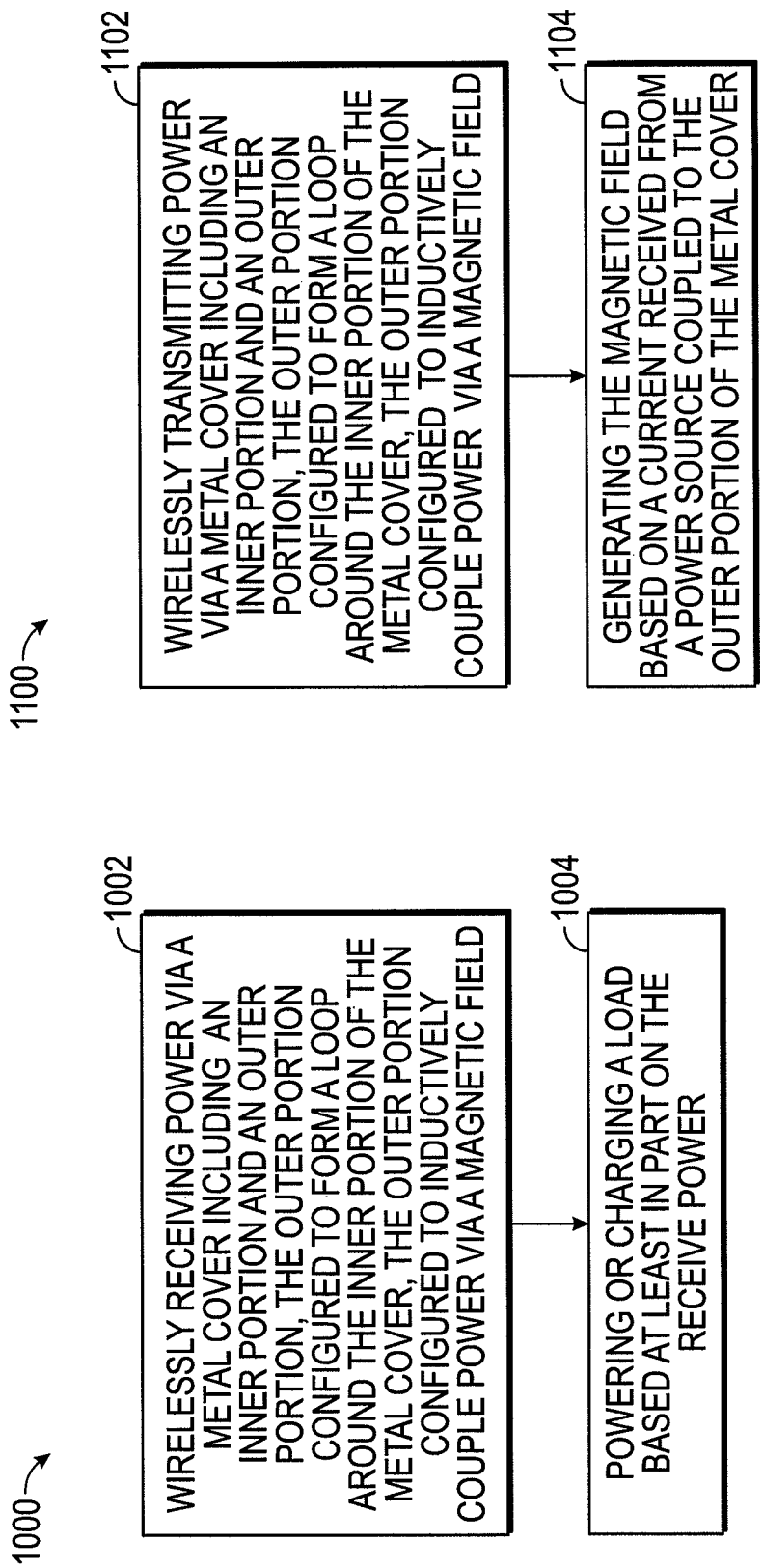

WIRELESS POWER TRANSFER THROUGH A METAL OBJECT

CROSS REFERENCE TO RELATED APPLICATIONS

The present application claims the benefit of priority to Provisional Application No. 62/021,665 entitled "METHODS AND SYSTEMS FOR WIRELESS POWER TRANSFER THROUGH A METAL OBJECT" filed Jul. 7, 2014, and assigned to the assignee hereof. Provisional Application No. 62/021,665 is hereby expressly incorporated by reference herein in its entirety.

FIELD

The described technology generally relates to wireless power. More specifically, the disclosure is directed to devices, systems, and methods related to transferring wireless power by a wireless power charging system through a metal object.

BACKGROUND

In wireless power applications, wireless power charging systems may provide the ability to charge and/or power electronic devices without physical, electrical connections, thus reducing the number of components required for operation of the electronic devices and simplifying the use of the electronic device. Such wireless power charging systems may comprise a transmitter antenna and other transmitting circuitry configured to generate a magnetic field that may induce a current in a receiver antenna that may be connected to the electronic device to be charged or powered wirelessly. Some portable electronic devices may have housings made of various materials including metal. As it is desirable to incorporate wireless power circuitry into various portable electronic devices, there is a need for a system and method for performing wireless power transfer through metal objects.

SUMMARY

The implementations disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various implementations provide several advantages over current wireless charging systems.

An apparatus for wirelessly receiving power via a magnetic field. The apparatus includes a metal cover including an inner portion and an outer portion. The outer portion is configured to form a loop around the inner portion of the metal cover. The outer portion is configured to inductively couple power via the magnetic field. The apparatus further includes a receive circuit electrically coupled to the outer portion and configured to receive a current from the outer portion generated in response to the magnetic field. The receive circuit is configured to charge or power a load based on the current.

In another aspect an apparatus for transmitting wireless power is provided. The apparatus includes a metal cover including an inner portion and an outer portion, the outer portion configured to form a loop around the inner portion of the metal cover. The metal cover is configured to generate a wireless power field based on a current received from a power source.

In yet another aspect an apparatus for receiving wireless power is provided. The apparatus includes a metal ring comprising at least one slot configured to make the metal ring discontinuous at least one location. The apparatus further includes a receive circuitry coupled to the metal ring and configured to receive a current from the metal ring. The metal ring is configured to generate the current based on exposure to a magnetic field.

In yet another aspect, a method for wirelessly receiving power via a magnetic field is provided. The method includes wirelessly receiving power via a metal cover comprising an inner portion and an outer portion. The outer portion is configured to form a loop around the inner portion of the metal cover. The outer portion is configured to inductively couple power via the magnetic field. The method further includes powering or charging a load based on the receive power.

In yet another aspect, an apparatus for receiving wireless power from a magnetic field is provided. The apparatus includes conducting means for partially housing a portable electronic device. The conducting means includes an inner portion and an outer portion. The outer portion is configured to form a loop around the inner portion of the conducting means. The outer portion includes means for inductively coupling power via the magnetic field. The apparatus further includes means for powering or charging a load based on power receiving via the outer portion.

In yet another aspect, an apparatus for wirelessly receiving power is provided. The apparatus includes a housing portion configured to form a back of a portable electronic device. The housing has a first dimension. The housing portion includes a metal portion having a second dimension the same size as or having a size that covers a majority of the first dimension of the housing portion. At least a portion of the metal portion is configured to inductively couple power via a magnetic field at a level sufficient for charging or powering a load of the portable electronic device. The apparatus further includes an electrical connection electrically coupled to the metal portion and configured to provide received power to the portable electronic device.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIG. 10 is a flowchart of an exemplary method of receiving wireless power via a wireless field, in accordance with another exemplary implementation.

FIG. 11 is a flowchart of an exemplary method of transmitting wireless power via a wireless field, in accordance with another exemplary implementation.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

The terminology used herein is for the purpose of describing particular implementations only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
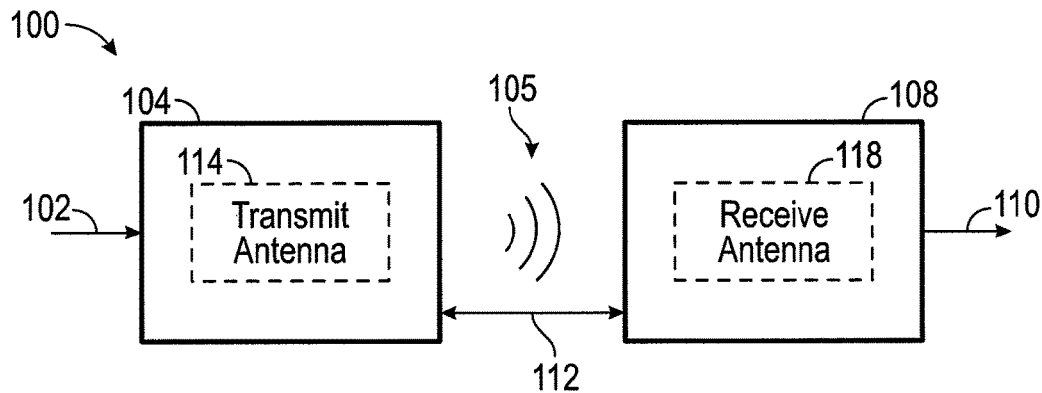
FIG. 1 is a functional block diagram of a wireless power transfer system, in accordance with one exemplary implementation.

FIG. 1 is a functional block diagram of a wireless power transfer system 100, in accordance with one exemplary implementation. Input power 102 is provided to a transmitter 104 from a power source (not shown in this figure) to generate a wireless (e.g., magnetic or electromagnetic) field 105 for performing energy transfer. A receiver 108 couples to the wireless field 105 and generates output power 110 for storing or consumption by a device (not shown in this figure) coupled to the output power 110. Both the transmitter 104 and the receiver 108 are separated by a distance 112.

The receiver 108 may wirelessly receive power when the receiver 108 is located in the wireless field 105 generated by the transmitter 104. The transmitter 104 includes a transmit antenna or coil 114 for transmitting energy to the receiver 108 via the wireless field 105. The receiver 108 includes a receive antenna or coil 118 for receiving or capturing energy transmitted from the transmitter 104 via the wireless field 105. The wireless field 105 corresponds to a region where energy output by the transmitter 104 may be captured by the receiver 108. In some implementations, the wireless field 105 may correspond to the "near-field" of the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

In one exemplary implementation, the wireless field 105 may be a magnetic field and the transmitter 104 and the receiver 108 are configured to inductively transfer power. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are reduced. Resonant inductive coupling techniques may allow for improved efficiency and power transfer over various distances and with a variety of inductive coil configurations. When configured according to a mutual resonant relationship, in an implementation, the transmitter 104 outputs a time varying magnetic field with a frequency corresponding to the resonant frequency of the transmit coil 114. When the receiver 108 is within the wireless field 105, the time varying magnetic field may induce a current in the receive coil 118. When the receive coil 118 is configured to resonate at the frequency of the transmit coil 114, energy may be more efficiently transferred. The alternating current (AC) induced in the receive coil 118 may be rectified as described above to produce direct current (DC) that may be provided to charge or to power a load (not shown).

Figure 2:
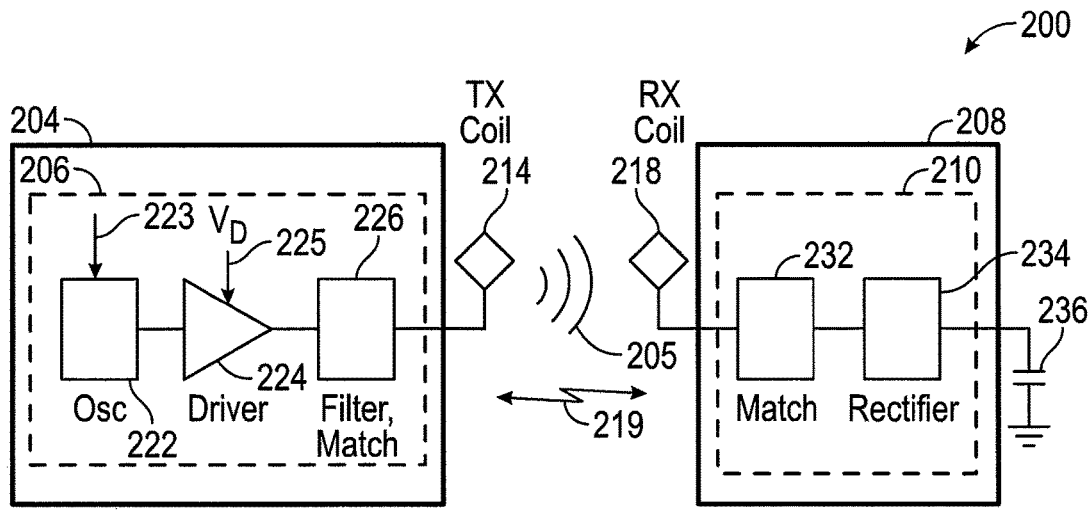
FIG. 2 is a functional block diagram of a wireless power transfer system, in accordance with another exemplary implementation.

FIG. 2 is a functional block diagram of a wireless power transfer system 200, in accordance with an exemplary implementation. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that is adjusted in response to a frequency control signal 223. The oscillator 222 provides the oscillator signal to the driver circuit 224. The driver circuit 224 is configured to drive a transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave or square wave.

The filter and matching circuit 226 filters out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236, for example.

The receiver 208 includes receive circuitry 210 that includes a matching circuit 232 and a rectifier circuit 234. The matching circuit 232 may match the impedance of the receive circuitry 210 to a receive antenna 218. The rectifier circuit 234 may generate a direct current (DC) power output from an alternate current (AC) power input to charge a battery 236. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

Figure 3:
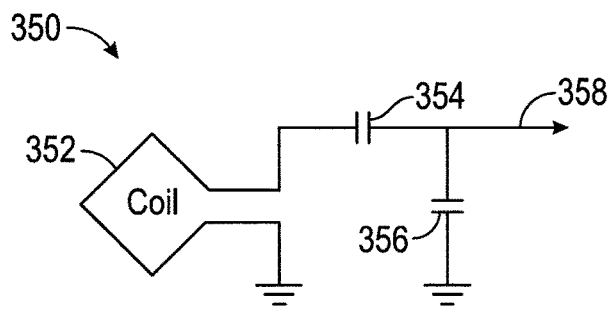
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2, in accordance with exemplary implementations. As illustrated in FIG. 3, transmit or receive circuitry 350 includes an antenna 352. The antenna 352 may also be referred to or be configured as a "loop" antenna 352. The antenna 352 may also be referred to herein or be configured as a "magnetic" antenna or an induction coil. The term "antenna" generally refers to a component that wirelessly outputs or receives energy for coupling to another "antenna." The antenna 352 may also be referred to as a coil or inductor of a type that is configured to wirelessly output or receive power. As used herein, the antenna 352 is an example of a "power transfer component" of a type that is configured to wirelessly output and/or receive power. The antenna 352 may include an air core or a physical core such as a ferrite core (not shown in this figure).

The antenna 352 may form a portion of a resonant circuit configured to resonate at a resonant frequency. The resonant frequency of the loop or magnetic antenna 352 is based on the inductance and capacitance. Inductance may be simply the inductance created by the antenna 352, whereas, a capacitor may be added to create a resonant structure at a desired resonant frequency. As a non-limiting example, a capacitor 354 and a capacitor 356 are added to the transmit or receive circuitry 350 to create a resonant circuit that resonates at a desired frequency of operation. Accordingly, for larger diameter antennas, the size of capacitance needed to sustain resonance may decrease as the diameter or inductance of the loop increases. Other resonant circuits formed using other components are also possible.

As another non-limiting example, a capacitor (not shown) may be placed in parallel between the two terminals of the circuitry 350. For transmit antennas, a signal 358, with a frequency that substantially corresponds to the resonant frequency of the antenna 352, may be an input to the antenna 352.

Figure 4:
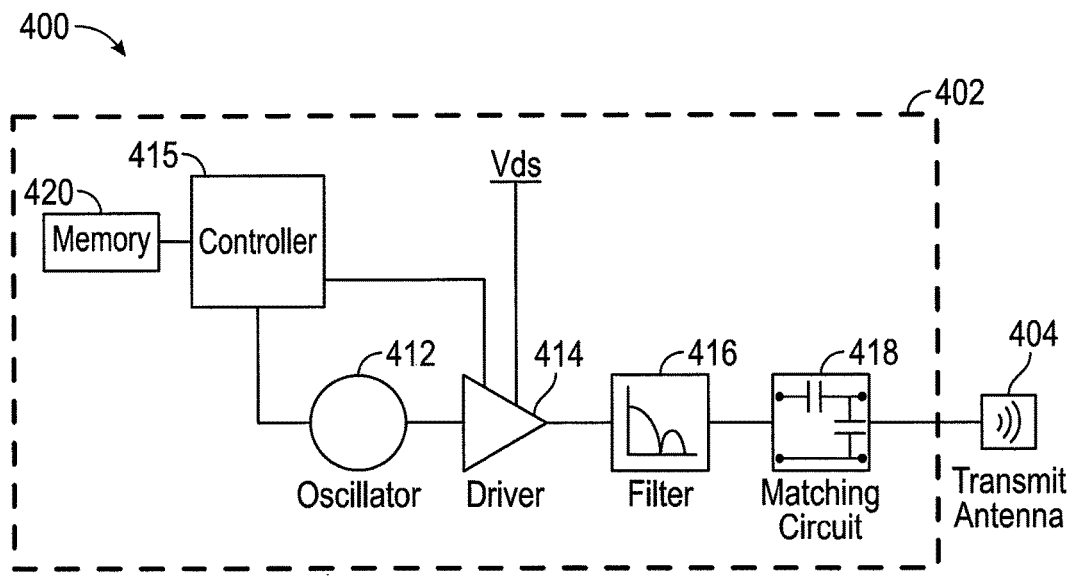
FIG. 4 is a functional block diagram of a transmitter that may be used in an inductive power transfer system, in accordance with exemplary implementations of the invention.

FIG. 4 is a simplified functional block diagram of a transmitter 400 that may be used in an inductive power transfer system, in accordance with exemplary implementations of the invention. The transmitter 400 includes transmit circuitry 402 and a transmit antenna 404 operably coupled to the transmit circuitry 402. In some implementations, the transmit antenna 404 is configured as the transmit antenna 214 as described above in reference to FIG. 2. In some implementations, the transmit antenna 404 is or may be referred to as a coil (e.g., an induction coil). In some implementations, the transmit antenna 404 is associated with a larger structure, such as a pad, table, mat, lamp, or other stationary configuration. In some implementations, the transmit antenna 404 is configured to generate an electromagnetic or magnetic field within a charging region. In an exemplary implementation, the transmit antenna 404 is configured to transmit power to a receiver device within the charging region at a power level sufficient to charge or power the receiver device.

The transmit circuitry 402 may receive power through a number of power sources (not shown). The transmit circuitry 402 may include various components configured to drive the transmit antenna 404. In some exemplary implementations, the transmit circuitry 402 may be configured to adjust the transmission of wireless power based on the presence and constitution of the receiver devices as described herein. As such, the transmit circuitry 402 may provide wireless power efficiently and safely.

The transmit circuitry 402 includes a controller 415. In some implementations, the controller 415 may be a microcontroller or a processor. In other implementations, the controller 415 may be implemented as an application-specific integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 further includes a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 further includes an oscillator 412 operably connected to the controller 415. In some implementations, the oscillator 412 is configured as the oscillator 222 as described above in reference to FIG. 2. The oscillator 412 may be configured to generate an oscillating signal at the operating frequency of the wireless power transfer. In some implementations, the transmit circuitry 402 is configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of charging power to the transmit antenna 404 via the signal, which may generate energy (e.g., magnetic flux) about the transmit antenna 404.

The transmit circuitry 402 further includes a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 further includes a low pass filter (LPF) 416 operably connected to the transmit antenna 404. The low pass filter 416 may be configured as the filter portion of the matching circuit 418 as described above in reference to FIG. 2. In some exemplary implementations, the low pass filter 416 may be configured to receive and filter an analog signal of current and an analog signal of voltage generated by the driver circuit 414. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specific frequencies while passing others.

The transmit circuitry 402 may further include a fixed impedance matching circuit 418 operably connected to the low pass filter 416 and the transmit antenna 404. The matching circuit 418 may be configured as the matching portion of the filter and matching circuit 226 as described above in reference to FIG. 2. The matching circuit 418 may be configured to match the impedance of the transmit circuitry 402 to the transmit antenna 404. Other exemplary implementations may include an adaptive impedance match that may be varied based on measurable transmit metrics, such as the measured output power to the transmit antenna 404 or a DC current of the driver circuit 414.

The transmit circuitry 402 may further comprise discrete devices, discrete circuits, and/or an integrated assembly of components.

Transmit antenna 404 may be implemented as an antenna strip with the thickness, width and metal type selected to keep resistive losses low. In an implementation, the transmit antenna 404 may generally be configured for association with a larger structure such as a pad, table, mat, lamp or other less portable configuration. In an exemplary application where the transmit antenna 404 may be larger in diameter relative to the receive antenna, the transmit antenna 404 will not necessarily need a large number of turns to obtain a reasonable inductance to form a portion of a resonant circuit tuned to a desired operating frequency.

Figure 5:
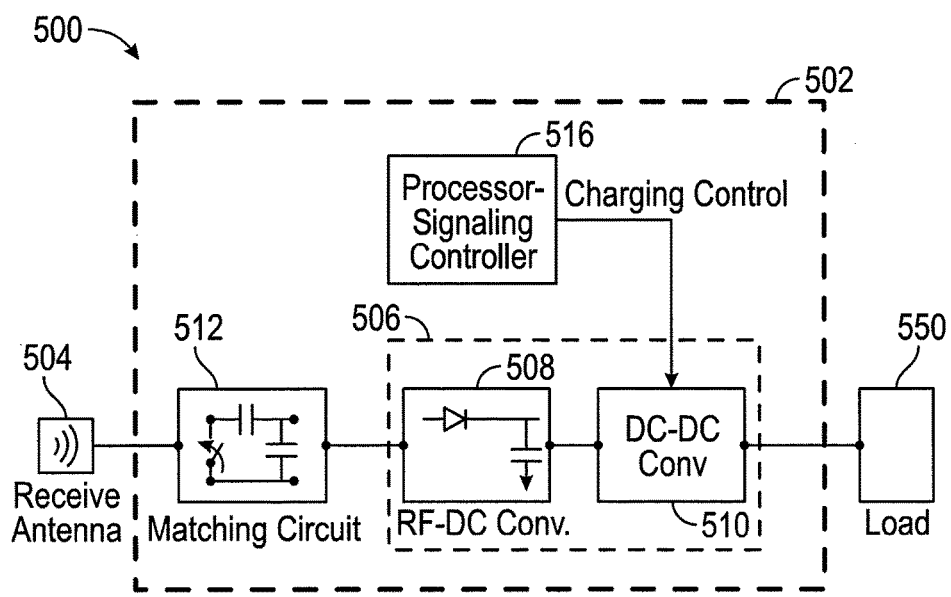
FIG. 5 is a functional block diagram of a receiver that may be used in the inductive power transfer system, in accordance with exemplary implementations of the invention.

FIG. 5 is a block diagram of a receiver 500, in accordance with an implementation of the present invention. A receiver 500 includes a receive circuitry 502, a receive antenna 504, and a load 550. The receiver circuitry 502 is electrically coupled to the load 550 for providing received charging power thereto. It should be noted that receiver 500 is illustrated as being external to load 550 but may be integrated into load 550. The receive antenna 504 is operably connected to the receive circuitry 502. The receive antenna 504 may be configured as the receive antenna 218 as described above in reference to FIG. 2/FIG. 3. In some implementations, the receive antenna 504 may be tuned to resonate at a frequency similar to a resonant frequency of the transmit antenna 404, or within a specified range of frequencies, as described above. The receive antenna 504 may be similarly dimensioned with transmit antenna 404 or may be differently sized based upon the dimensions of the load 550. The receive antenna 504 may be configured to couple to a magnetic field generated by the transmit antenna 404 (FIG. 4), as described above, and provide an amount of received energy to the receive circuitry 502 to power or charge the load 550.

The receive circuitry 502 is operably coupled to the receive antenna 504 and the load 550. The receive circuitry may be configured as the receive circuitry 210 as described above in reference to FIG. 2. The impedance presented to the receive antenna by the receive circuitry 502 may be configured to match an impedance of the receive antenna 504 (e.g., via the matching circuit 512) which may increase efficiency. The receive circuitry 502 may be configured to generate power based on the energy received from the receive antenna 504. The receive circuitry 502 may be configured to provide the generated power to the load 550. In some implementations, the receiver 500 may be configured to transmit a signal to the transmitter 400 indicating an amount of power received from the transmitter 400.

The receive circuitry 502 includes a processor-signaling controller 516 configured to coordinate the processes of the receiver 500.

The receive circuitry 502 includes power conversion circuitry 506 for converting a received energy source into charging power for use by the load 550. The power conversion circuitry 506 includes an AC-to-DC converter 508 coupled to a DC-to-DC converter 510. The AC-to-DC converter 508 rectifies the AC from the receive antenna 504 into DC while the DC-to-DC converter 510 converts the rectified energy signal into an energy potential (e.g., voltage) that is compatible with the load 550. Various AC-to-DC converters are contemplated including partial and full rectifiers, regulators, bridges, doublers, as well as linear and switching converters.

The receive circuitry 502 may further include switching circuitry 512 configured to connect the receive antenna 504 to the power conversion circuitry 506 or alternatively for disconnecting the power conversion circuitry 506 from the receive antenna 504. Disconnecting the receive antenna 504 from the power conversion circuitry 506 not only suspends charging of the load 550, but also changes the "load" as "seen" by the transmitter 400 (FIG. 4) as is explained more fully below.

The wireless power circuitry described above, and particularly the receive circuitry 502, is intended to be incorporated into a variety of portable electronic devices. Some portable devices may have housings or other portions that are made of a variety of materials including metal. As metal housing portions may be affected by wireless power transfer, certain aspects of various implementations described herein are related to incorporating wireless power circuitry into devices with metal covers/housings.

Figure 6A:
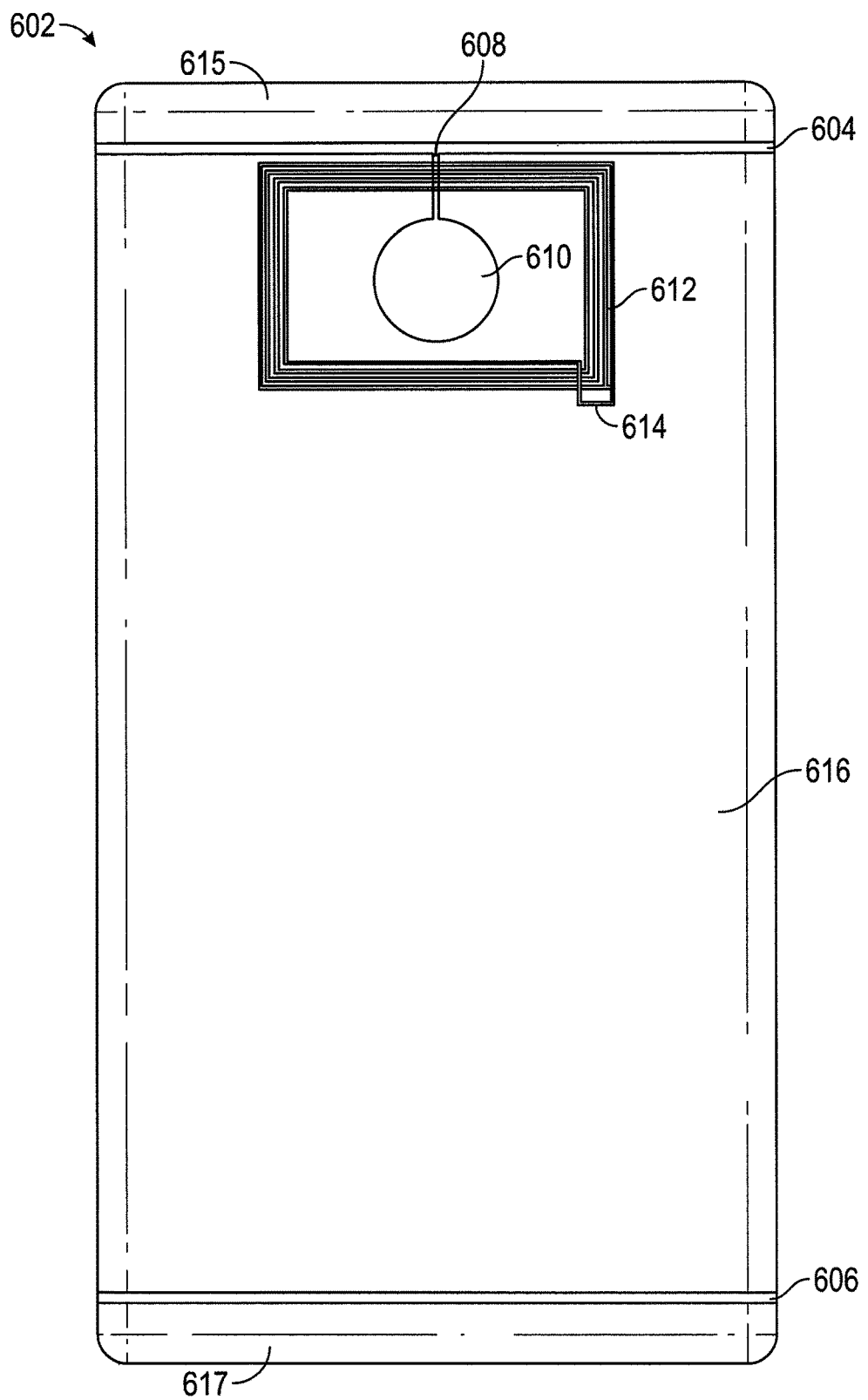
FIG. 6A is a diagram of a metal back cover used in a portable electronic device.

FIG. 6A is a diagram of a metal back cover 602 used in a portable electronic device (not shown). The metal back cover 602 shown may be a back cover that physically couples to the back of a portable electronic device (e.g., a cell-phone, or a tablet, or the like) or forms a back portion of a housing of a portable electronic device. For example, the metal back cover 602 may mechanically couple to the back of a portable electronic device. The metal back cover 602 may be mostly metal (e.g., aluminum) but may have other non-metal components as well for various purposes (e.g., holding various portions of the cover together). As shown in FIG. 6A, a portion represents the metal back cover 602 of a device (e.g., a cell phone or a media device, etc.). A plurality of horizontal slots 604 and 606 running across the metal back cover 602 in the horizontal direction are provided (the term "slot" as described herein may refer to any gap of any dimension or other non-conductive area or material). The top horizontal slot 604 is a slot across the top of the metal back cover 602, and the bottom horizontal slot 606 is a slot across the bottom of the metal back cover 602. The horizontal slots 604 and 606, represented by a white space between shaded portions of the metal back cover 602, are not connected to each other. A vertical slot 608 connects a hole 610 (e.g., a camera hole) or other non-metal portion in the metal back cover 602 to the top horizontal slot 604. A rectangular near field communication ("NFC") coil 612 surrounds the hole 610 in the metal back cover 602 while staying entirely below the top horizontal slot 604. In other implementations, the NFC coil 612 may be of any other shape. A source 614 (e.g., a current feed, a power source, etc.) is shown coupled to the NFC coil 612. The NFC coil 612 may function as a transmit antenna 404 or receive antenna 504 for transmitting or receiving NFC communications. The horizontal slots 604 and 606 divide the metal back cover 602 into three distinct sections, a top section 615, a middle section 616, and a bottom section 617. In some implementations, these three distinct sections may be electrically isolated from one another.

The horizontal slots 604 and 606 and the vertical slot 608 may represent sections where the metal back cover 602 is cut and replaced with a non-conductive material (e.g., plastic or rubber). In some implementations, the horizontal slots 604 and 606 may function to hold portions of the back-cover together. For example, the horizontal slots 604 and 606 divide the metal back cover 602 into the three discrete sections 615, 616, and 617, and the non-conductive material comprising the top horizontal slot 604 holds the sections 615 and 616 together and the bottom horizontal slot 606 holds the sections 616 and 617 together. The source 614 may generate and feed a current into the NFC coil 612 in a counterclockwise direction. The current flow through the NFC coil 612 may generate a magnetic field about the NFC coil 612, which may induce a current (i.e., AC) on the metal back cover 602 section 616. This current in the middle section 616 may induce a current in both the top section 615 and the bottom section 617. The directions of the currents on the top section 615 and the bottom section 617 may be opposite the current direction on the middle section 616. In some implementations, the top horizontal slot 604 and the bottom horizontal slot 606 may act as "transmission lines." In a transmission line, the current flows in one direction on a first side of the transmission line (i.e., the middle section 616 side of top horizontal slot 604) while the current on the other side of the transmission line flows 180 degrees out of phase from the current on the first side. The direction of the current flow on the metal back cover 602 may be opposite the direction of the current flow through the NFC coil 612.

An eddy current (not shown in this figure) may be induced on the metal back cover 602 section 616 and may be used for mutual coupling for NFC communications. In some implementations, an eddy current flow is most concentrated around the hole 610 and around the top horizontal slot 604 and the vertical slot 608 (nearest the NFC coil 612), with a minimal concentration at the bottom of the section 616 near the bottom horizontal slot 606 (furthest from the NFC coil 612).

As separate sections of the metal back cover 602, the top section 615, the middle section 616, and the bottom section 617 may function as independent antennas. For example, the middle section 616 may be used for NFC communications, as described above in relation to the NFC coil 612, and may be electrically coupled to the NFC circuitry (here, inductively coupled). Similarly, the top section 615 may be used for GPS, Wi-Fi, or diversity communications and may be electrically coupled to GPS, Wi-Fi, or diversity transmitter/receiver circuitry. Similarly, the bottom section 617 may be used for cellular communications and thus may be electrically coupled to cellular communication circuitry. As such, each of the top section 615, middle section 616, and bottom section 617 may comprise one of the transmit antenna 404 or the receive antenna 504 referenced in FIGS. 4 and 5. The NFC circuitry, the GPS circuitry, the Wi-Fi circuitry, and the cellular circuitry may comprise one or more of elements and components. Thus, the metal back cover 602 may serve a variety of purposes.

Figure 6B:
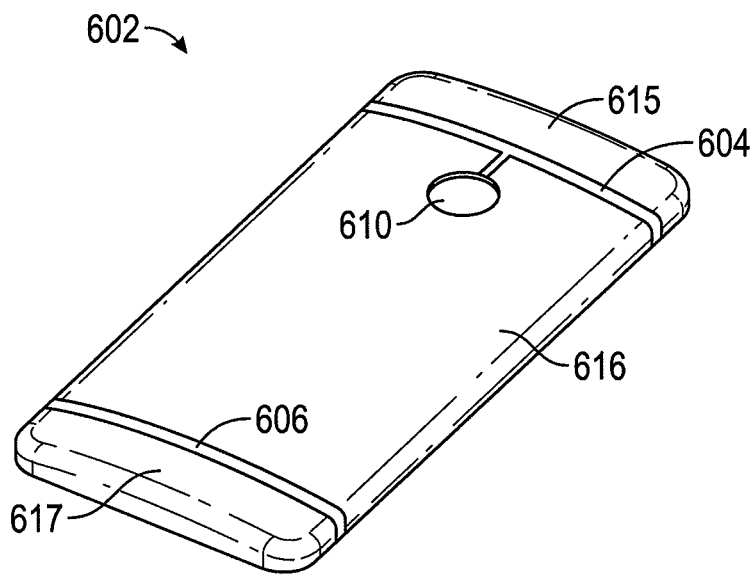
FIG. 6B is a diagram of an isometric view of the metal back cover of FIG. 6A.

FIG. 6B is diagram of an isometric view of the metal back cover of FIG. 6A. As shown in FIG. 6B, top section 615 is separated from the middle section 616 by horizontal slot 604, while the middle section 616 is separated from the bottom section 617 by horizontal slot 606. The hole 610 is connected to the horizontal slot 604 by the vertical slot 608.

Figure 6C:
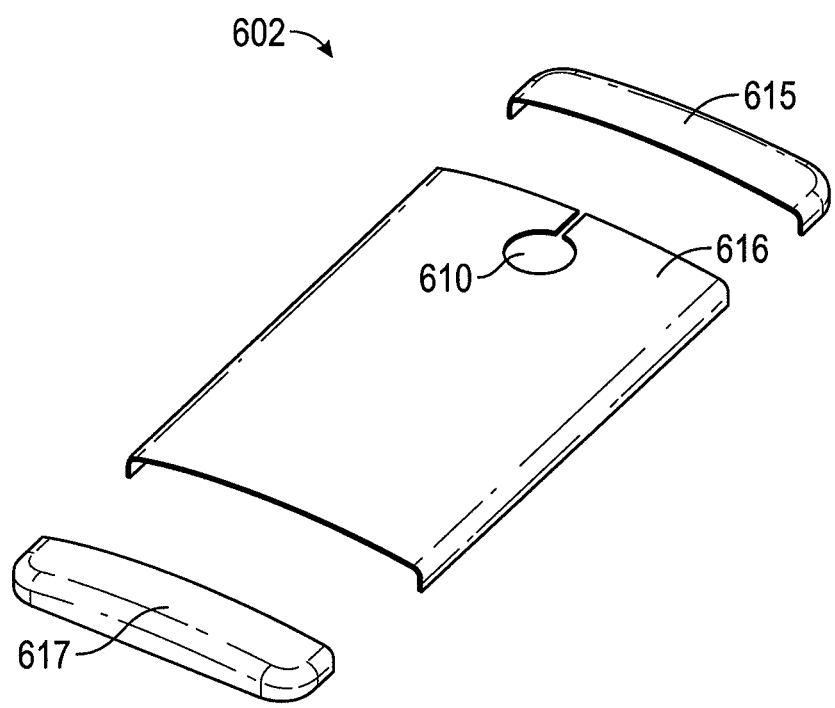
FIG. 6C is a diagram of an exploded isometric view of the metal back cover of FIG. 6A.

FIG. 6C is a diagram of an exploded isometric view of the metal back cover of FIG. 6A. As shown in FIG. 6C, the top section 615, middle section 616, and bottom section 617 are separate from each other. As discussed above, the individual sections 615, 616, and 617 may be held together by the material filling horizontal slots 604 and 606. FIG. 6C more clearly shows how the individual sections 615, 616, and 617 may be configured to be distinct and separate pieces and may function as separate antennas isolated from each other by the horizontal slots 604 and 606.

The implementation shown in FIGS. 6A, 6B, and 6C may be improved to accommodate wireless power transfer. For example, with reference to the implementation shown in FIG. 6A, when currents are induced in the metal back cover 602 in response to a magnetic field at levels sufficient for wireless power transfer for charging or powering devices, the metal back cover 602 may have a resistance that is too high to accommodate efficient wireless power transfer and may even impede the wireless power transfer. For example, the resistance of the metal back cover 602 in the implementation shown in FIG. 6A subjected to the currents discussed above may be approximately 7Ω at 6.78 MHz. Such a high resistance may cause losses of greater than 20% of end to end wireless power transfer efficiencies, which may lead to substantial power losses at wireless power transfer levels for charging or powering devices.

Figure 7A:
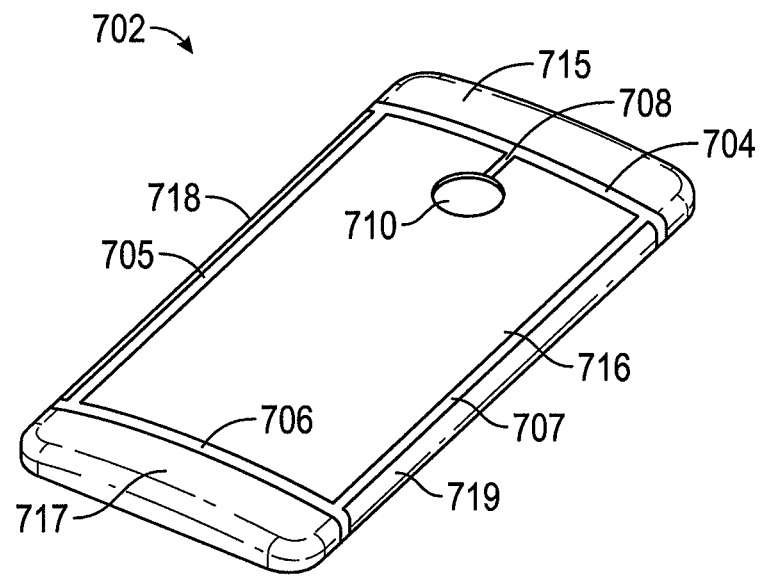
FIG. 7A is a diagram of an isometric view of a metal back cover configured for inductive power transfer, in accordance with one exemplary implementation.

FIG. 7A is a diagram of an isometric view of a metal back cover 702 configured for inductive power transfer, in accordance with one exemplary implementation. The metal back cover 702 of FIG. 7 is configured to have a reduced resistance when used for wireless power transfer to enable wireless power transfer efficiently through the metal back cover 702, in accordance with one exemplary implementation. The metal back cover 702 may be configured to mechanically couple to the back of the device. The metal back cover 702 shown may be a back cover that physically couples to the back of a portable electronic device (e.g., a cellular phone, a GPS unit, a watch, a mobile media device, a laptop computer, a key fob, or the like) or forms a portion of a back housing of a portable electronic device. For example, the metal back cover 702 may mechanically couple to the back of the portable electronic device or form a portion of the back of the portable electronic device. The metal back cover 702 may be mostly metal (e.g., aluminum) but may have other non-metal components as well for various purposes (e.g., holding various portions together) as described above with reference to FIG. 6A. The device having the metal back cover 702 may embody a portion of the transmitter 400 or receiver 500 as referenced in FIGS. 4 and 5, respectively (or may be coupled to the circuitry of the transmitter 400 or receiver 500 as referenced in FIGS. 4 and 5). The metal back cover 702 may have sides that curve around slightly to couple to a front portion of the portable electronic device. The metal back cover 702 may appear similar to the metal back cover 602 of FIG. 6A, comprising the horizontal slots 704 and 706 and the vertical slot 708 connecting the hole 710 to the top horizontal slot 704 (as described above the term "slot" as described herein may refer to any gap of any dimension or other non-conductive area or material). However, the metal back cover 702 comprises additional slots 705 and 707 running vertically up the sides of the metal back cover 702, the left vertical slot 705 being shown on the left side of the metal back cover 702 and the right vertical slot 707 being shown on the right side of the metal back cover 702. As discussed above in reference to FIG. 6A, the slots may represent locations where the metal back cover 702 is cutaway and replaced with non-conductive material (e.g., rubber or plastic). Thus, the vertical slots 705 and 707 and the horizontal slots 704 and 706 split the metal back cover 702 into five distinct portions or sections 715-719. In some implementations, the horizontal slots 704 and 706 and the vertical slots 705 and 707 may function to hold portions of the back-cover together. A top section 715 is separated from the remaining metal back cover sections 716-719 by the top horizontal slot 704, while a right section 719 is separated from the metal back cover sections 715-718 by the horizontal slots 704 and 706 and the right vertical slot 707. A bottom section 717 is separated from the metal back cover sections 715, 716, 718, and 719 by the bottom horizontal slot 706, and a left section 718 is separated from the rest of the metal back cover sections 715-717, and 719 via the horizontal slots 704 and 706 and the left vertical slot 705. A middle section 716 is separated from the remaining metal back cover sections 715 and 717-719 via all of the slots 704, 705, 706, and 707. A feed point (not shown in this figure) may indicate a general feed location at which a power source or a feed for receiving power (not shown on this figure) may be connected to the metal back cover 702. In some implementations, the feed point may be connected at another location on the metal back cover 702.

In some implementations, the metal back cover 702 may not utilize an NFC coil and may not be excited via an induced magnetic field generated by current through another coil (e.g., the NFC coil 612). Instead, in some implementations, the metal back cover 702 may be directly excited via a source connected at the feed point or a current may be generated in the metal back cover 702 in response to being positioned within an alternating magnetic field generated by a wireless power transmitter 400 (FIG. 4). In some implementations, referring to FIG. 4, the source connected at the feed point may represent the transmit circuitry 402 where the device is a transmitter. In other implementations, referring to FIG. 5, the feed point may represent an electrical connection that may be provided to conversion circuitry 506 for providing the generated current to a load 550. As depicted in FIG. 7A, the horizontal slots 704 and 706, combined with the vertical slots 705 and 707, may comprise a "slot loop" (i.e., a single turn loop formed by the horizontal and vertical slots). Accordingly, a coil/loop of the metal back cover 702, formed by the sections 715, 717, 718, and 719, may form a coil/loop having at least one turn that may be used as an antenna for transmission or reception of power. The metal back cover sections 715, 719, 717, and 718, in clockwise order around the metal back cover 702, form the coil. As shown in FIG. 7A, in some implementations the coil formed by the sections 715, 717, 718, and 719 forms a loop around the perimeter of the metal cover 702. As will be discussed in further detail below, in some implementations, the sections 715, 719, 717, and 718 forming the coil may not be contiguous at all powers or frequencies. In some implementations, the sections 715, 719, 717, and 718 forming the coil connect in some manner (e.g., through an electrical filter or through an electrical connection). In some implementations, the coil formed by sections 715, 717, 718, and 719 may operate similar to the transmit antenna 404 or the receive antenna 504 referenced in FIGS. 4 and 5.

Using the sections 715, 717, 718, and 719 to form the coil/loop may allow for the elimination of a separate wireless power coil. In some implementations, the NFC coil 612 (FIG. 6) may be maintained in the implementation of FIG. 7 (not shown).

In some implementations, when directly excited at the feed point, the coil formed by the sections 715, 717, 718, and 719 may operate as a transmitting antenna (e.g., transmit antenna 404 (FIG. 4)). As the current provided at the feed point flows around the coil formed by sections 715, 717, 718, and 719 of the metal back cover 702, a magnetic field may be generated around the periphery of the metal back cover 702 and the corresponding slots 704, 705, 706, and 707 that separate the sections 715, 716, 717, 718, and 719. The magnetic field generated by the excited metal back cover 702 may be configured to generate a wireless power transfer field and may induce mutual coupling with receive antennas.

In other implementations, the coil formed by the sections 715, 717, 718, and 719 may operate as a receiving antenna (e.g., receive antenna 504 (FIG. 5)). As the coil formed by the sections 715, 717, 718, and 719 is exposed to an alternating magnetic field generated by a wireless power transmitter, a voltage may be induced causing a current flow around the coil formed by the sections 715, 717, 718, and 719. The current is directed to the feed point and thereon to receive circuitry (e.g., the receive circuitry 502 of FIG. 5) for providing charging power to load. The coil/loop inductor formed by the sections 715, 717, 718, and 719 may be electrically connected to a capacitor to form a resonate circuit/resonator as described above and configured to resonate at a desired frequency (e.g., the operating frequency of power transmission).

In accordance with such, in an implementation, a metal cover 702 includes an inner portion (e.g., section 716) and an outer portion (e.g., the sections 715, 717, 718, and 719). The outer portion is configured to form a loop around the inner portion of the metal cover 702. The outer portion is configured to inductively couple power via a magnetic field generated by a transmitter 400 (FIG. 4). A receive circuit (e.g., a portion of or all of the circuitry 502 of FIG. 5) is electrically coupled to the outer portion and is configured to receive current from the outer portion generated in response to the magnetic field. The receive circuit is configured to charge or power a load based on the current. As mentioned above, and as will be described in further detail below, the metal back cover 702 may further include a conductive coupler configured to electrically couple the outer portion to the inner portion where the inner portion functions at least in part as a reference ground to the outer portion. Furthermore as mentioned above, in an aspect of an implementation, a plurality of slots 704-707 separate the outer portion into a plurality of segments where the plurality of segments may be electrically coupled via at least one electrical coupler to form a single loop of a coil. In yet another aspect of an implementation, the outer portion may form a portion of a resonant circuit comprising the outer portion and a capacitor electrically coupled to the outer portion. The resonant circuit is configured to resonate at the frequency of the magnetic field. In a further aspect, a plurality of slots 704, 705, 706, and 707 extend around a periphery of the metal back cover 702. As further described above, the metal back cover 702 may form a portion of a housing portion configured to form part of a housing or enclosure or is configured to mechanically couple to a portable electronic device.

In another aspect of an implementation, an apparatus for wirelessly receiving power is provided. The apparatus includes a housing portion (e.g., including the metal back cover 702 as just described) configured to form a back of a portable electronic device. The housing has a first dimension. The housing portion includes a metal portion (e.g., the metal back cover 702) that has a second dimension that is the same size or has a size that covers a majority of the first dimension of the housing portion. At least a portion of the metal portion is configured to inductively couple power via a magnetic field at a level sufficient for charging or powering a load of the portable electronic device. The apparatus further includes an electrical connection (e.g., the feed point described above) electrically coupled to the metal portion and configured to provide received power to the portable electronic device. The metal portion may be configured to generate current in response to a voltage induced by the magnetic field generated by a transmitter. Furthermore, as described with reference to FIG. 7, the metal portion may include an inner portion (e.g., section 716) and an outer portion (e.g., the sections 715, 717, 718, and 719). The outer portion is configured to form a loop around the inner portion of the metal portion forming at least one turn of a coil configured to inductively couple the power via the magnetic field.

When wirelessly receiving power at a desired frequency, the resistance of the section 716, alone or in combination with other portions of the metal back cover 702 as described above in relation to FIG. 7A, may be reduced, as compared to resistance of the implementation described with reference to FIG. 6A. As an exemplary, non-limiting example, when wirelessly receiving power at a frequency on the order of 6.78 MHz, the resistance of the implementation described with reference to FIG. 7A may be on the order of less than 0.5Ω, as compared to the resistance of the implementation described with reference to FIG. 6A which may be on the order of around 7Ω. Such a low resistance may be more conducive to wireless power applications (i.e., applications utilizing the transfer of wireless power (e.g., on the order of around one or multiple Watts)), as losses may be significantly reduced. Furthermore, the metal back cover 702 of FIG. 7A has a low resistance while maintaining strong mutual coupling properties (e.g., strong mutual inductance) between the transmitter/receiver.

Figure 7B:
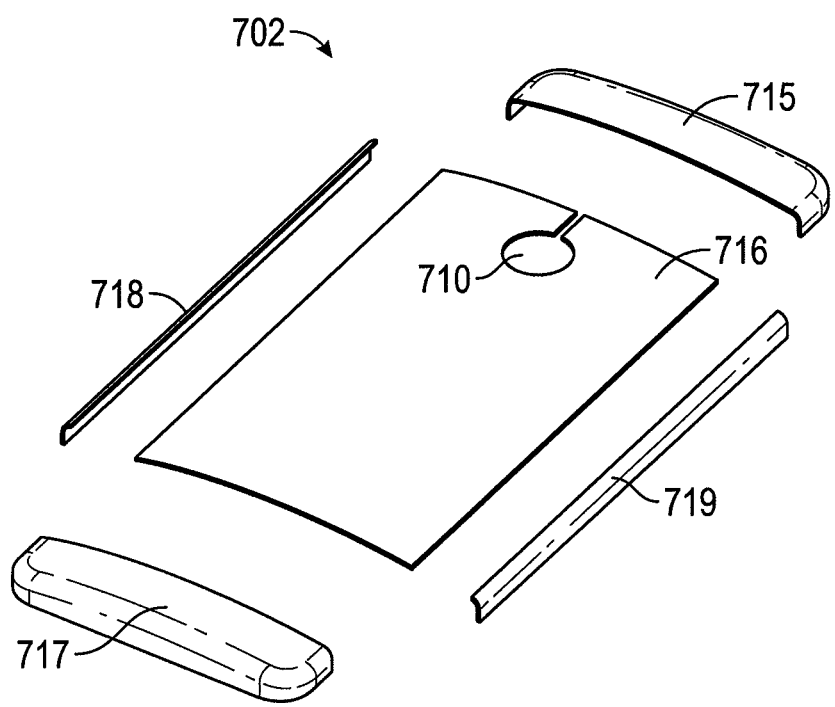
FIG. 7B is a diagram of an exploded isometric view of the metal back cover of FIG. 7A.

FIG. 7B is a diagram of an exploded isometric view of the metal back cover of FIG. 7A. As shown in FIG. 7B, the top section 715, middle section 716, bottom section 717, left section 718, and right section 719 are separate from each other. As discussed above, the individual sections 715, 716, 717, 718, and 719 may be held together by the material filling horizontal slots 704 and 706 and vertical slots 705 and 707 of FIG. 7A. FIG. 7B more clearly shows how the individual sections 715, 716, 717, 718, and 719 may be configured to be distinct and separate pieces and may function as separate antennas isolated from each other by the horizontal and vertical slots 704-707.

Additionally, as an example, the middle section 716 of the metal back cover 702 may affect the magnetic field (i.e., H-field) of the coil/loop formed by sections 715, 717, 718, and 719. The magnetic field may be strongest at the hole 710 due to current that flows along the hole. The magnetic field may be constructively added inside the hole, generating the strongest magnetic field at the center of the hole. In some implementations with different hole 710 shapes, the magnetic field distributions may vary. In some implementations, the resistance of the metal back cover 702 (or the section 716 of the metal back cover 702) may be increased in an area surrounding the hole 710. This increase may be due to equipment near the hole 710 being constructed of metal and/or being grounded (i.e., the frame/chassis of the camera may be metal and may be grounded to a local ground, or a ferrite core of the NFC coil). The increased resistance in this area may be caused by the eddy currents generated in metal or ferrite structures being exposed to magnetic fields (i.e., a magnetic field being generated by the coil/loop formed by sections 715, 717, 718, and 719 when connected to the feed point and receiving the current therefrom).

Figure 8A:
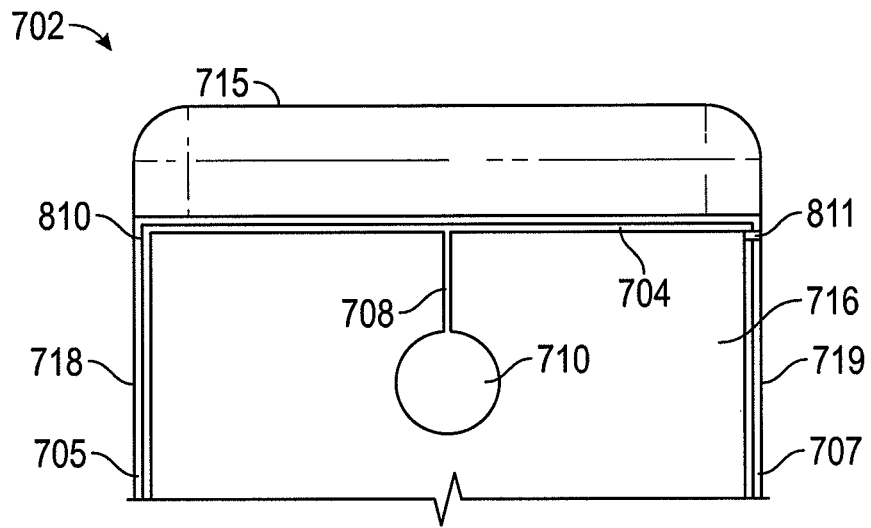
FIG. 8A is a diagram of a perspective view of a metal back cover further enlarged and having additional components, in accordance with one exemplary implementation.

FIG. 8A is a diagram of a perspective view of a metal back cover 702 further enlarged and having additional components, in accordance with one exemplary implementation. As shown in FIG. 8A, a portion of the metal back cover 702, including the top section 715, the top horizontal slot 704, and the vertical slot 708 connecting the top horizontal slot 704 to the hole 710, is depicted. FIG. 8A also shows portions of the right section 719, the vertical slots 705 and 707, the middle section 716, and the left section 718. Additionally, FIG. 8 introduces two new components: an inner trace 810 and a conductive connection 811. The inner trace 810 is shown as a line running through the center of each of the left vertical slot 705, the top horizontal slot 704, and the right vertical slot 707. The inner trace 810 may be a conductive element that passes through each of the horizontal and vertical slots 704, 705, 706, and 707 (not all shown in this figure). The conductive connection 811 is shown connecting the middle section 716 of the metal back cover 702 to the right section 719 of the metal back cover 702. In some implementations, the inner trace 810 may flow through all portions of the horizontal and vertical slots 704, 705, 706, and 707.

In some implementations, one or more of the inner trace 810 and the conductive connection 811 may be included in the implementation of FIG. 7A to improve inductance of the coil created by the periphery of the metal back cover 702 and to increase design freedom. In some implementations, the inner traces 810 is installed within the horizontal and vertical slots 704, 706, 705, and 707. In some implementations, the inner trace 810 is connected to one or more of the sections 715, 717, 718, and 719 of the periphery of the metal back cover 702 (not shown in this figure). This connection between the inner trace 810 and one or more of the sections 715, 717, 718, and 719 effectively connects the inner trace 810 to the coil discussed above formed by the sections 715, 717, 718, and 719. Connecting the inner trace 810 to the coil formed by sections 715, 717, 718, and 719 may effectively increase the inductance of the coil by adding at least one additional loop or turn. Thus, in some implementations, the combination of the inner trace 810 and the coil formed by sections 715, 717, 718, and 719 is at least a two turn coil. The first turn may be the loop formed by sections 715, 717, 718, and 719, and the second coil being the inner trace 810 around the horizontal and vertical slots 704-707. The inner trace 810 may influence the magnetic field generated by the current flowing through the coil formed by sections 715, 717, 718, and 719. The presence and attachment of the inner trace coil 810 to the coil formed by sections 715, 717, 718, and 719 may strengthen the magnetic field generated by the coil as opposed to concentrating the strongest portion of the magnetic field around the hole 710 as discussed above. Thus, inclusion of additional inner traces coupled to the one or more of the sections 715, 717, 718, and 719 may impact the strength and distribution of the magnetic field generated by a current flow through the loop when used as a receive antenna.

In some implementations, the inner trace 810 is coupled to the section 716 of the metal back cover 702 as opposed to one of the sections 715, 717, 718, and 719. Coupling the inner trace 810 to the middle section 716 may provide a common reference ground plane for reduction of electromagnetic interference (EMI) or RF de-sense on all antennas of the device. In some implementations, the inner trace 810 may comprise a plurality of conductive traces that create a plurality of loops around the section 716 within the horizontal and vertical slots 704, 705, 706, and 707. The presence of additional conductive traces and/or a plurality of loops formed by the inner trace 810 may increase the impact the inner trace 810 has on the strength and distribution of the magnetic field. In some implementations, the location of the connection of the inner trace 810 to the coil formed by sections 715, 717, 718, and 719 and/or the number of connections between the inner trace 810 and the coil formed by sections 715, 717, 718, and 719 may vary and multiple contact points can be present. In some implementations, the location of the connections between the inner trace 810 and the coil formed by sections 715, 717, 718, and 719 may be influenced by the current distribution, as current may be added constructively or destructively. As such, in accordance with the implementations described herein one or more inner traces and/or connections as just described may be selected to control a distribution and a shape of the magnetic field in the metal back cover 702 when transmitting or receiving power wirelessly.

In some implementations, the inner traces 810 may not be disposed within the horizontal and vertical slots 704-707 and instead be disposed internal to the metal back cover 702. In some implementations, the single or multiple turns of inner traces 810 may be disposed in or on a circuit board or other configuration that is not coplanar with the horizontal and vertical slots 704-707. In some implementations, the inner trace 810 may be disposed in a plastic molding in order to increase inductance or mutual coupling. For example, the inner trace 810 may be deposited or wired directly on a plastic molding or other material that is installed internal to the metal back cover 702.

In some implementations, the conductive connection 811 may connect the middle section 716 of the metal back cover 702 to at least one of the four sections of the coil formed by sections 715, 717, 718, and 719. The FIG. 8A shows the conductive connection 811 located at the top right corner of the metal back cover 702, near the vicinity of the feed point. In some implementations, the conductive connection 811 may be located at one or more other points anywhere around the middle section 716 so long as the conductive connection 811 connects the middle section 716 to one of sections 715, 717, 718, and 719. In some implementations, the number and location of the conductive connections 811 may provide design freedoms for the antennas used for GPS, Wi-Fi, and cellular communications, among others. In some implementations, the conductive connection 811 is accomplished via electrical connections in a circuit board internal to the metal back cover 702. In some implementations, the conductive connection 811 comprises an electrical connection external to the metal back cover 702. Connecting the middle section 716 to one of the sections 715, 717, 718, and 719 may connect the coil/antenna formed by the sections 715, 717, 718, and 719 to the reference ground and may allow the coil/antenna formed by the sections 715, 717, 718, and 719 to use the reference ground that may be coupled to the middle section 716 of the metal back cover 702. In some implementations, connecting the middle section 716 to the coil formed by sections 715, 717, 718, and 719 may provide for a more stable reference ground than without the conductive connection 811. In other implementations, the coil formed by sections 715, 717, 718, and 719 may not be connected to the middle section 716.

Figure 8B:
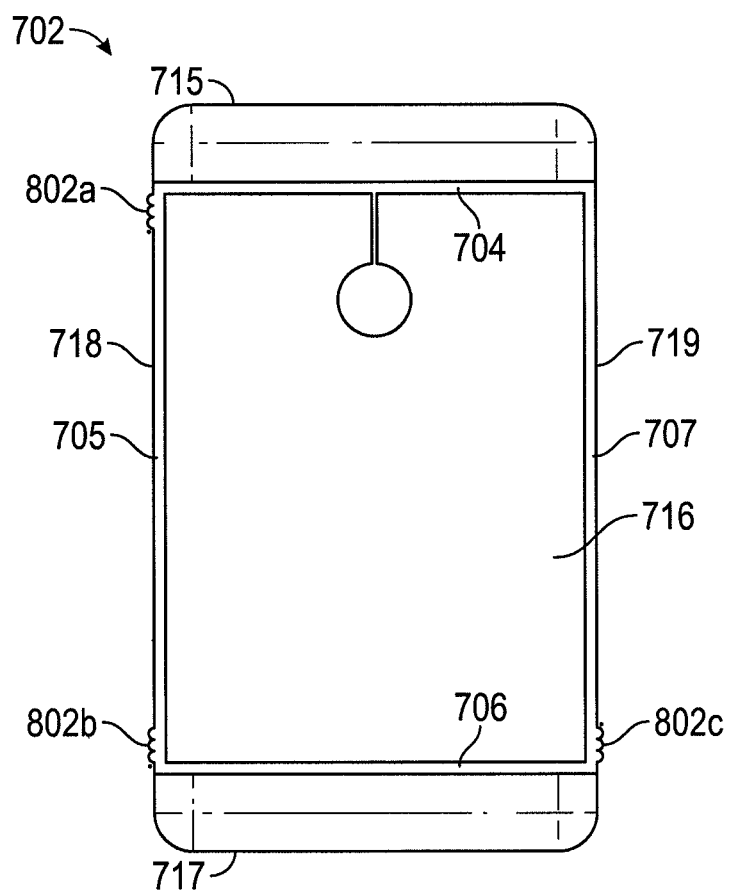
FIG. 8B is a diagram of a perspective view of a metal back cover having additional components, in accordance with one exemplary implementation.

FIG. 8B is a diagram of a metal back cover 702 having a reduced resistance and enables wireless power transfer through the metal back cover 702 efficiently, in accordance with another exemplary implementation. As shown in FIG. 8B, the individual sections 715, 718, 717, and 719 are sequentially electrically coupled via the plurality of electrical filters 802a-802c. In an implementation, the electrical filters 802a-802c includes inductive chokes. The electrical filters 802a-802c may be configured to allow current to pass through the electrical coupler based on a frequency of the current. For example, top section 715 is electrically and physically coupled to left section 718 via electrical filter 802a (e.g., an inductive choke), while left section 718 is electrically and physically coupled to bottom section 717 via electrical filter 802b (e.g., an inductive choke). Bottom section 717 is electrically and physically coupled to right section 719 via electrical filter 802c (inductive choke). Thus, the loop formed by the sections 715, 718, 717, and 719 described above comprises the plurality of electrical filters 802a-802c connecting the individual sections 715, 717, 718, and 719. In some implementations, the electrical filters 802a-802 may be replaced with other circuitry capable of acting as a filter circuit or switch at certain frequencies. In some implementations, the electrical filters 802a-802c or similar structures may be disposed on a printed circuit board (PCB) (not shown in this figure). In some implementations, the electrical filters 802a-802c may be disposed directly on the metal back cover section 715, 717, 718, and 719 or via a flexible circuit board or other flexible connection. The remaining components depicted in FIG. 8B are the same as the components identified in FIG. 7A.

As discussed briefly above, in some implementations, the individual sections 715, 717, 718, and 719 may be configured to operate as individual antennas. In such implementations, the electrical filters 802a-802c (e.g., inductive chokes) may function to isolate the individual sections 715, 717, 718, and 719 from one another dependent upon the frequency of current flowing through the electrical filters 802a-802c or similar structures. For example, at a wireless power frequency of 6.78 MHz, the electrical filters 802a-802c may remain in a "closed" state and allow current to flow through the electrical filters 802a-802c to each of the connected sections 715, 717, 718, and 719. Thus, at the wireless power frequency of 6.78 MHz, the electrical filter 802a may allow current to flow between top section 715 and left section 718. Similarly, the electrical filter 802b may allow current to flow between left section 718 and bottom section 717. Finally, the electrical filter 802c may allow current to flow between the bottom section 717 and the right section 719. However, at higher frequencies, for example at GPS or cellular frequencies (both at least in the hundreds of MHz range), the electrical filters 802a-802c may restrict current flow. For example, current generated by the top section 715 when functioning as a GPS antenna may not flow through electrical filter 802a and thus may remain within the top section 715. The flow of currents between the sections 715, 717, 718, and 719 may be impeded may be impeded when they are generated at frequencies higher than those used in wireless power transmission. Accordingly, the top section 715 and the bottom section 717 may remain isolated from one another and from the right and left sections 719 and 718, respectively, in such implementations. Thus, at the higher GPS and cellular frequencies, for example, the individual sections may continue to function as independent antennas for their respective frequency bands. These electrical filters 802a-802c or similar structures may allow for the reduction of electromagnetic interference or other sensitivities. The electrical isolation provided by the electrical filters 802a-802c or similar equipment may limit electromagnetic interference or radio frequency de-sense.

In some implementations of FIGS. 7-8B, one or more of the sections 715, 717, 718, and 719 may be configured to independently operate as a discrete antenna, for example a GPS, cellular, Wi-Fi, or diversity antenna. For example, the top section 715 may be configured to operate as or in conjunction with a GPS antenna and may be electrically coupled to GPS transmitter/receiver circuitry, as discussed in relation to top section 615 of FIG. 6A above. The bottom section 717 may be configured to operate as or in conjunction with a cellular antenna, similar to the bottom section 617 discussed in relation to FIG. 6A above. Similarly, the left and right sections 718 and 719, respectively, may be configured to operate as or in conjunction with Bluetooth, Wi-Fi, or diversity antennas. In some implementations, one or more of the sections 715, 717, 718, and 719, may operate as or in conjunction with an antenna for any of the purposes described above (e.g., GPS, cellular, Bluetooth, Wi-Fi, diversity, etc.). In some implementations, the middle section 716 may be connected to a reference ground internal to the device. In some implementations, the reference ground may be used by the one or more antennas (e.g., GPS, cellular, etc.) described above or one or more circuits described above. In some implementations, the coil formed by sections 715, 717, 718, and 719 may not be connected to the reference ground. Accordingly, each of the top section 715, the left section 718, right section 719, and the bottom section 717 may comprise one of the transmit antenna 404 or the receive antenna 504 referenced in FIGS. 4 and 5. The GPS circuitry, the Wi-Fi circuitry, the diversity circuitry, and the cellular circuitry (not shown in this figure) may comprise one or more of the elements and components of transmit circuitry 402 or receive circuitry 502 also of FIGS. 4 and 5.

In some implementations, the metal back cover 702 and associated components may operate as receiving circuitry and components in the reverse of the functions described above. Similarly, any of the components discussed above as comprising components or circuitry of FIG. 4 may similarly comprise components or circuitry of FIG. 5. In such implementations, the coil formed by sections 715, 717, 718, and 719 of the metal back cover 702 may function as a receive coil or antenna, generating a current in response to a magnetic field to which the metal back cover 702 is exposed. The generated current may then be fed, via the feed point, to receive circuitry that may manipulate the generated current to provide wireless power. Similarly, the remaining components discussed in relation to FIGS. 6-8B may serve similar purposes as discussed above.

Figure 8C:
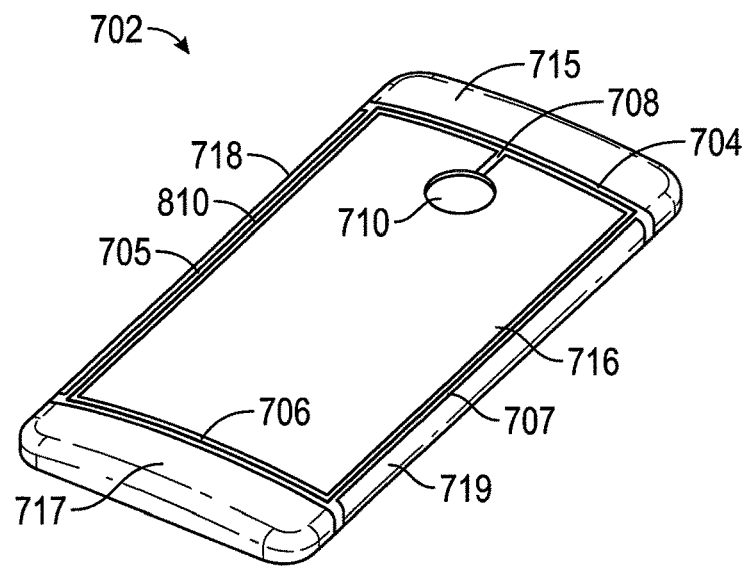
FIG. 8C is a diagram of an isometric view of a metal back cover comprising the additional components described in relation to FIG. 8A.

FIG. 8C is a diagram of an isometric view of the metal back cover comprising the additional components described in relation to FIG. 8A. As shown in FIG. 8C, the inner trace 810 is embedded within the horizontal and vertical slots 704-707. The horizontal and vertical slots 704-707 hold the top section 715, the middle section 716, the bottom section 717, the left section 718, and the right section 719 together.

Figure 8D:
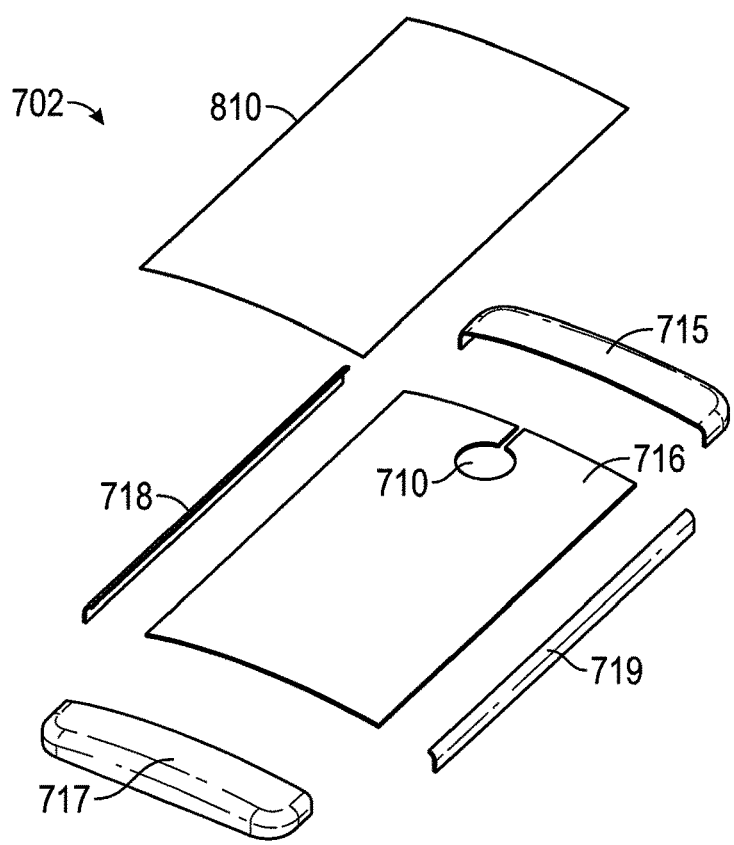
FIG. 8D is a diagram of an exploded isometric view of a metal back cover as described in FIG. 8C.

FIG. 8D is a diagram of an exploded isometric view of the metal back cover as described in FIG. 8C. As shown in FIG. 8C, the top section 715, the middle section 716, the bottom section 717, the left section 718, and the right section 719 are separate from each other. As discussed above, the individual sections 715, 716, 717, 718, and 719 may be held together by the material filling horizontal slots 704 and 706 and vertical slots 705 and 707 of FIG. 7A-8C. As described in relation to FIGS. 7A-8C, vertical slot 708 connects the hole 710 to the top slot 704. FIG. 8D more clearly shows how the individual sections 715, 716, 717, 718, and 719 are distinct and separate pieces and may function as separate antennas isolated from each other by the horizontal and vertical slots 704-707. Additionally, FIG. 8D shows the inner trace 810 as a distinct component separate from the material of the slots 704-707, making a continuous loop substantially around the periphery of the metal back cover 702.

Figure 9A:
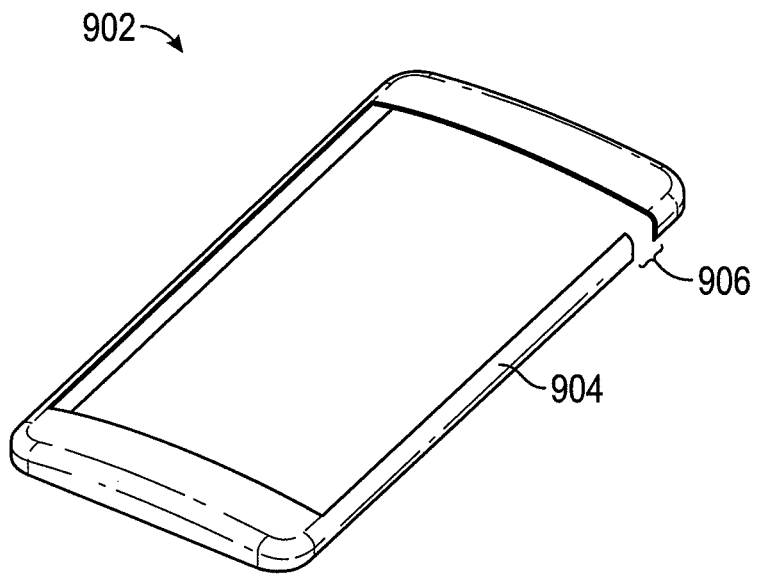
FIG. 9A is a diagram of a metal band configured to operate as a loop antenna for inductive power transfer, in accordance with another exemplary implementation.

FIG. 9A is a diagram of a metal band configured to operate as a loop antenna, in accordance with an exemplary implementation. As shown in FIG. 9, a metal chassis 902 comprises at least one metal ring 904 and a feed 906 of the metal chassis 902. The metal ring 904 may not be a continuous ring. The metal ring 904 coupled to a feed 906. The feed 906 may be configured to couple the metal ring 904 to a source (i.e., a transmitter) or sink (i.e., a receiver) (not shown in this figure). In some implementations, the metal ring 904 may be configured to generate a magnetic field for the transfer of wireless power in response to an AC current flowing through the metal ring 904, the AC current coming from the feed 906. Thus, the metal ring 904 may be configured to transfer wireless power through a metal object. In another implementation, the metal ring 904 is configured to act as a receive antenna as described above.

In some implementations, the metal ring 904 may also operate as at least one of a cellular, Wi-Fi, GPS, or diversity antenna. In some implementations, as discussed in relation to FIG. 8B, electrical filters such as inductive chokes (not shown in this figure) may be used to isolate the metal ring 904 from specific components or other antenna circuitry dependent upon frequencies of a current flow through the metal ring 904. In some implementations, the metal ring 904 may be split into multiple pieces (not shown in this figure), and each piece may be configured to operate as or in conjunction with at least one of a GPS antenna, a cellular antenna, a Wi-Fi antenna, a diversity antenna, or a cellular antenna. However, in order to provide the ability to receive or transmit wireless power, the multiple pieces must be connecting into a single loop or slot antenna. In some implementations, one or more portions of the device chassis may be utilized to connect the one or more pieces into a single loop or slot antenna. As discussed above, in some implementations, these portions of the device chassis may be configured to function as electrical filters. At frequencies above the 6.78 MHz of the wireless power range, the connection portions with the chassis may act as the electrical filters above and allow each of the multiple pieces to be electrically isolated. When operating at 6.78 MHz of the wireless power range, the connection portions with the chassis may not act as the electrical filters and may allow the portions to operate as the loop antenna or the slot loop.

Figure 9B:
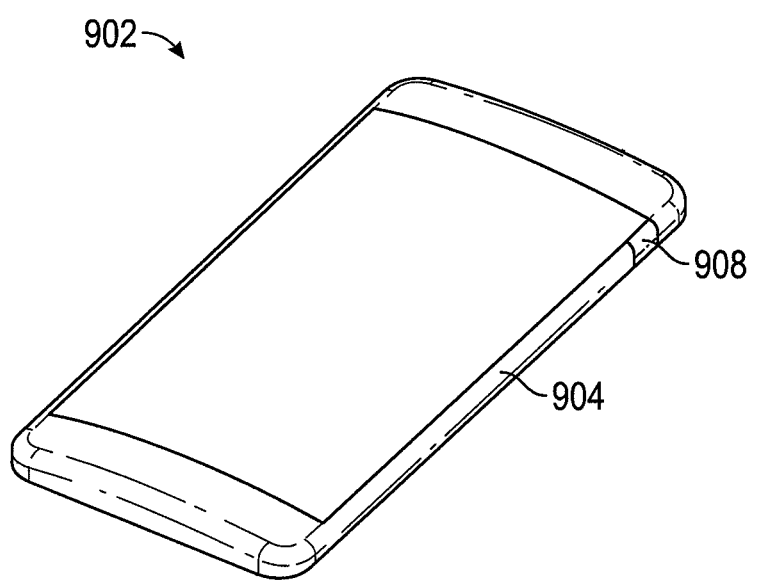
FIG. 9B is a diagram of the metal band of FIG. 9A configured to operate as a loop antenna for inductive power transfer, in accordance with another exemplary implementation.

FIG. 9B is a diagram of the metal band of FIG. 9A configured to operate as a loop antenna, in accordance with another exemplary implementation. As shown in FIG. 9B, the metal ring 904 is shown without the source feed of the chassis or any other components of the device. A slot 908 causes the metal ring 904 to be discontinuous as discussed above. A plurality of slots 908 may be used, as described above, to break the metal ring 904 into multiple pieces (not shown in this figure).

FIG. 10 is a flowchart of an exemplary method 1000 of wirelessly receiving power via a wireless field. In an implementation, the metal back cover 702 of FIGS. 7A-8D may perform the method 1000. In some implementations, the metal chassis 902 may perform the method 1000.

At block 1002, power is wirelessly received via a metal cover. The metal cover may comprise the metal cover 702 of FIGS. 7A-8D. The metal cover may comprise an inner portion and an outer portion. The outer portion is configured to form a loop around the inner portion of the metal cover 702 (FIG. 7). In some implementations, a plurality of slots separates the inner portion and the outer portion. The plurality of slots may comprise slots 705-708 of FIGS. 7A-8D. In some implementations, the plurality of slots may comprise individual slots on each side of the metal cover that run orthogonally to the slots with which they intersect. In some implementations, the intersecting slots may not be orthogonal to each other. The outer portion is configured to inductively couple power via the magnetic field. For example, the outer portion may be configured to form a single or multi turn antenna or coil capable of generating a current when exposed to a magnetic field.

At block 1004, the load is powered or charged based at least in part on the received power. The load may comprise a wireless power receive circuit (or other circuitry configured to receive the current generated by the outer portion).

FIG. 11 is a flowchart of an exemplary method 1100 of transmitting wireless power via a wireless field. In an embodiment, the metal back cover 702 of FIGS. 7A-8D may perform the method 1100. In some implementations, the metal chassis 902 may perform the method 1100.

At block 1102, the method 1100 includes wirelessly transmits power via a metal cover. The metal cover may comprise the metal back cover 702 of FIGS. 7A-8D. The metal cover may comprise an inner portion and an outer portion. The outer portion is configured to form a loop around the inner portion of the metal cover. The outer portion is configured to inductively couple power via a magnetic field. In some implementations, a plurality of slots separates the inner portion and the outer portion. In some implementations, the plurality of slots may comprise individual slots on each side of the metal cover that run orthogonally to the slots with which they intersect. In some implementations, the intersecting slots may not be orthogonal to each other. The outer portion loop may be configured to form a single turn antenna or coil capable of generating a magnetic field when a current is driven through the outer portion.

At block 1104, the method 1100 may generate the magnetic field based on the current received from a power source coupled to the outer portion of the metal cover. The power source may comprise a current source or a wireless power transmit circuit (or other circuitry configured to generate the current to drive the outer portion).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a conducting means for partially housing a portable electronic device may comprise a metal back cover 702 (FIG. 7). In addition, means for inductively coupling power via the magnetic field may include a receive antenna 504 (FIG. 5) that may include an outer portion of a metal back cover 702. Furthermore, means for powering or charging a load may include receive circuitry 502 (FIG. 5).

Further examples of implementations/embodiments of the invention are defined as follows:

1. An apparatus for wirelessly receiving power via a magnetic field. The apparatus includes a metal cover including an inner portion and an outer portion, the outer portion configured to form a loop around the inner portion of the metal cover, the outer portion configured to inductively couple power via the magnetic field. The apparatus further includes a receive circuit electrically coupled to the outer portion and configured to receive a current from the outer portion generated in response to the magnetic field, the receive circuit configured to charge or power a load based on the current.

2. The apparatus of example 1, further including a conductive coupler configured to electrically couple the outer portion to the inner portion.

3. The apparatus of any of the preceding examples, further including a conductive trace inserted within each of a plurality of slots separating the inner portion from the outer portion, the conductive trace configured to substantially form a second loop around the inner portion of the metal cover but within the outer portion of the metal cover.

4. The apparatus of example 3, wherein the conductive trace within each of the plurality of slots is electrically coupled to the outer portion.

5. The apparatus of example 4, wherein the outer portion forms a first turn of an inductor and the conductive trace forms a second turn of the inductor.

6. The apparatus of any of the preceding examples, wherein a plurality of slots separates the outer portion into a plurality of segments, the plurality of segments electrically coupled via at least one electrical coupler to form a single loop of a coil.

7. The apparatus of example 6, wherein the at least one electrical coupler includes an electrical filter.

8. The apparatus of example 7, wherein the electrical filter is configured to allow the current to pass through the electrical coupler based on a frequency of the current.

9. The apparatus of example 7, wherein the electrical filter is configured to allow the current to pass through the electrical coupler when the frequency of the current is substantially 6.78 MHz and is configured prevent the current from passing through the electrical coupler at frequencies substantially higher than 6.78 MHz.

10. The apparatus of any of the examples 7-9, wherein the electrical filter includes an inductive choke.

11. The apparatus of any of the preceding examples, wherein the apparatus further includes a resonant circuit including the outer portion and a capacitor electrically coupled to the outer portion, the resonant circuit configured to resonate at the frequency of the magnetic field.

12. The apparatus of example 1, wherein a plurality of slots separate the metal cover into the inner portion and the outer portion.

13. The apparatus of example 12, wherein the plurality of slots extend substantially around a periphery of the metal cover.

14. The apparatus of any of the preceding examples, wherein the loop forms at least one turn of a coil.

15. The apparatus of any of the preceding examples, wherein the apparatus includes at least one of a cellular phone, a GPS unit, a watch, a mobile media device, a laptop computer, or a key fob.

16. The apparatus of any of the preceding examples, further including a housing coupled to the metal cover.

17. The apparatus of any of the preceding examples, wherein the metal cover is configured as a metal back cover of a portable electronic device.

18. The apparatus of example 1, wherein the outer portion includes a metal ring including at least one slot, the at least one slot configured to make the metal ring discontinuous at least one location.

19. The apparatus of any of the preceding examples, wherein the inner portion functions as a reference ground to the outer portion.

20. The apparatus of any of the preceding examples, wherein a first resistance of the metal cover including the inner and outer portions in response to the magnetic field is reduced from a second resistance of a metal cover without inner and outer portions.

21. A method for wirelessly receiving power via a magnetic field. The method includes wirelessly receiving power via a metal cover including an inner portion and an outer portion, the outer portion configured to form a loop around the inner portion of the metal cover, the outer portion configured to inductively couple power via the magnetic field. The method further includes powering or charging a load based on the received power.

22. The method of example 21, wherein wirelessly receiving power via the metal cover further includes wirelessly receiving power via the metal cover further including a conductive trace inserted within each of a plurality of slots separating the outer portion from the inner portion, the conductive trace configured to substantially form a second loop around the inner portion of the metal cover but within the outer portion of the metal cover, the conductive trace electrically coupled to the outer portion.

23. The method of example 21, wherein a plurality of slots separate the outer portion into a plurality of segments and wherein the plurality of segments are electrically coupled to each other via at least one electrical coupler to form a single loop antenna.

24. The method of example 23, wherein the at least one electrical coupler includes an electrical filter.

25. The method of example 24, wherein the method further includes selectively allowing current to pass through the electrical coupler based on a frequency of the current via the electrical filter.

26. The method of example 25 wherein selectively allowing current to pass through the electrical coupler based on the frequency includes allowing the current to pass through the electrical coupler when the frequency of the current is substantially 6.78 MHz and preventing the current from passing through the electrical coupler at frequencies substantially higher than 6.78 MHz.

27. The method of any of examples 21-26, wherein the metal cover is part of at least one of a cellular phone, a GPS unit, a watch, a mobile media device, a laptop computer, or a key fob.

28. The method of any of examples 21-27, wherein a housing is coupled to the metal cover.

29. The method of example 21, wherein a plurality of slots separate the metal cover into the inner portion and the outer portion.

30. The method of any of examples 21-29, wherein the inner portion functions as a reference ground to the outer portion.

31. The method of any of examples 21-30, wherein a first resistance of the metal cover including the inner and outer portions in response to the magnetic field is reduced from a second resistance of a metal cover without inner and outer portions.

32. An apparatus for receiving wireless power from a magnetic field. The apparatus includes conducting means for partially housing a portable electronic device, the conducting means including an inner portion and an outer portion, the outer portion configured to form a loop around the inner portion of the conducting means, the outer portion including means for inductively coupling power via the magnetic field. The apparatus further includes means for powering or charging a load based on power receiving via the outer portion.

33. An apparatus for wirelessly receiving power. The apparatus includes a housing portion configured to form a back of a portable electronic device, the housing portion having a first dimension. The housing portions includes a metal portion having a second dimension the same size as or having a size that covers a majority of the first dimension of the housing portion, at least a portion of the metal portion configured to inductively couple power via a magnetic field at a level sufficient for charging or powering a load of the portable electronic device. The apparatus further includes an electrical connection electrically coupled to the metal portion and configured to provide received power to the portable electronic device.

34. The apparatus of example 33, wherein the metal portion is configured to generate current in response to a voltage induced by the magnetic field generated by a transmitter.

35. The apparatus of any of examples 33-34, wherein the metal portion includes an inner portion and an outer portion, the outer portion configured to form a loop around the inner portion of the metal portion forming at least one turn of a coil configured to inductively couple the power via the magnetic field.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described herein in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions may not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for wirelessly receiving power via a magnetic field, the apparatus comprising:
a metal cover that forms at least a portion of a housing, the metal cover comprising a first metal portion and a second metal portion that is electrically isolated from the first metal portion by at least one slot that is disposed between the first metal portion and the second metal portion and surrounds an entire perimeter of the second metal portion, the first metal portion forming a loop around a perimeter of the cover and entirely surrounding the second metal portion and the first metal portion configured to inductively couple power via the magnetic field, the magnetic field inducing a current in the first metal portion; and
a receive circuit electrically coupled to the first metal portion, housed within the housing, and configured to receive the current from the first metal portion and charge or power a load based on the current.

2. The apparatus of claim 1, further comprising a conductive coupler configured to electrically couple the first metal portion to the second metal portion.

3. The apparatus of claim 1, further comprising a conductive trace inserted within the at least one slot, the conductive trace configured to substantially form a second loop around the second metal portion of the metal cover but surrounded by the first metal portion of the metal cover.

4. The apparatus of claim 3, wherein the conductive trace within the at least one slot is electrically coupled to the first metal portion.

5. The apparatus of claim 4, wherein the first metal portion forms a first turn of an inductor and the conductive trace forms a second turn of the inductor.

6. The apparatus of claim 1, wherein a plurality of slots separates the first metal portion into a plurality of segments, the plurality of segments electrically coupled via at least one electrical coupler to form a single loop of a coil.

7. The apparatus of claim 6, wherein the at least one electrical coupler comprises an electrical filter.

8. The apparatus of claim 7, wherein the electrical filter is configured to allow the current to pass through the electrical coupler based on a frequency of the current.

9. The apparatus of claim 7, wherein the electrical filter is configured to allow the current to pass through the electrical coupler when the frequency of the current is substantially 6.78 MHz and is configured prevent the current from passing through the electrical coupler at frequencies substantially higher than 6.78 MHz.

10. The apparatus of claim 7, wherein the electrical filter comprises an inductive choke.

11. The apparatus of claim 1, wherein the first metal portion and a capacitor electrically coupled to the first metal portion form a resonant circuit, the resonant circuit configured to resonate at the frequency of the magnetic field.

12. The apparatus of claim 1, wherein the at least one slot comprises a plurality of slots that extends substantially around a periphery of the metal cover.

13. The apparatus of claim 1, wherein the first metal portion forms at least one turn of a coil.

14. The apparatus of claim 1, wherein the apparatus comprises at least one of a cellular phone, a GPS unit, a watch, a mobile media device, a laptop computer, or a key fob.

15. The apparatus of claim 1, further comprising the housing coupled to the metal cover.

16. The apparatus of claim 1, wherein the metal cover is configured as a metal back cover of a portable electronic device.

17. The apparatus of claim 1, wherein the first metal portion comprises a metal ring comprising at least one non-conductive portion configured to make the metal ring discontinuous at at least one location.

18. The apparatus of claim 1, wherein the second metal portion functions as a reference ground to the first metal portion.

19. The apparatus of claim 1, wherein a first resistance of the metal cover comprising the second and first metal portions when exposed to the magnetic field is less than a second resistance of a second metal cover without second and first metal portions.

20. A method for wirelessly receiving power via a magnetic field, the method comprising:
wirelessly receiving power via a metal cover that forms at least a portion of a housing, the metal cover comprising a first metal portion and a second metal portion that is electrically isolated from the first metal portion by at least one slot that is disposed between the first metal portion and the second metal portion and surrounds an entire perimeter of the second metal portion, the first metal portion forming a loop around a perimeter of the cover and entirely surrounding the second metal portion, the first metal portion configured to inductively couple power via the magnetic field, the magnetic field inducing a current in the first metal portion; and
powering or charging a load based on the received power via a receive circuit housed within the housing.

21. The method of claim 20, wherein wirelessly receiving power via the metal cover further comprises wirelessly receiving power via a conductive trace electrically coupled to the first metal portion, inserted within the at least one slot, and substantially forming a second loop around the second metal portion of the metal cover but surrounded by the first metal portion.

22. The method of claim 20, further comprising electrically coupling the first metal portion, comprising a plurality of segments separated by the at least one slot, into a single loop antenna via at least one electrical coupler.

23. The method of claim 22, wherein the electrically coupling comprises electrically coupling via an electrical filter.

24. The method of claim 23, wherein the method further comprises selectively allowing current to pass through the electrical coupler based on a frequency of the current via the electrical filter.

25. The method of claim 24, wherein selectively allowing current to pass through the electrical coupler based on the frequency comprises allowing the current to pass through the electrical coupler when the frequency of the current is substantially 6.78 MHz and preventing the current from passing through the electrical coupler at frequencies substantially higher than 6.78 MHz.

26. The method of claim 20, wherein the wirelessly receiving power via a cover comprises wirelessly receiving power via the cover of at least one of a cellular phone, a GPS unit, a watch, a mobile media device, a laptop computer, or a key fob.

27. The method of claim 20, wherein the wirelessly receiving power via a cover that forms at least a portion of a housing comprises wirelessly receiving power via the cover coupled to the housing.

28. The method of claim 20, further comprising providing a reference ground to the first metal portion via the second metal portion.

29. The method of claim 20, further comprising providing a first resistance of the metal cover comprising the second and first metal portions when exposed to the magnetic field that is less than a second resistance of a second metal cover without the second and first metal portions.

30. An apparatus for receiving wireless power from a magnetic field, comprising:
conducting means for partially housing a portable electronic device, the conducting means comprising conducting means for inductively coupling power via the magnetic field and conducting means for grounding that is electrically isolated from the inductively coupling power conductive means by at least one means for dividing that is disposed between the conducting means for inductively coupling power and the conducting means for grounding and surrounds an entire perimeter of the conductive means for grounding, the inductively coupling power conductive means forming a loop around a perimeter of the housing means and entirely surrounding the conductive grounding means, the magnetic field inducing a current in the inductively coupling power conductive means; and
means for powering or charging a load based on power received via the inductively coupling power conductive means, the powering or charging means housed within the housing means.

31. An apparatus for wirelessly receiving power, the apparatus comprising:
a housing portion configured to form a back of a portable electronic device, the housing portion having a first dimension, the housing portion comprising:
a metal portion having a second dimension the same size as or having a size that covers a majority of the first dimension of the housing portion and divided into a first metal portion and a second metal portion that is electrically isolated from the first metal portion by at least one slot that is disposed between the first metal portion and the second metal portion and surrounds an entire perimeter of the second metal portion, the first metal portion forming a loop around a perimeter of the second metal portion and entirely surrounding the second metal portion, the first metal portion configured to inductively couple power via a magnetic field at a level sufficient for charging or powering a load of the portable electronic device; and
an electrical connection electrically coupled to the first metal portion of the metal portion and configured to provide received power to the portable electronic device.

32. The apparatus of claim 31, wherein the metal portion is configured to generate current in response to a voltage induced by the magnetic field generated by a transmitter.

33. The apparatus of claim 31, wherein the first metal portion forms at least one turn of a coil configured to inductively couple the power via the magnetic field.

* * * * *